May 23, 1933.  W. D. STOCKMAN  1,910,779
LENS PROTECTOR FOR HEAD LAMPS
Filed Jan. 28, 1932  2 Sheets-Sheet 1
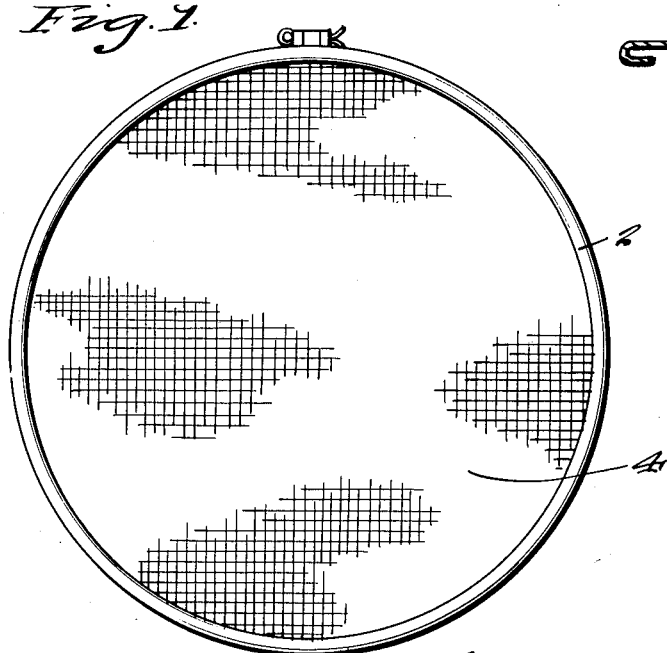
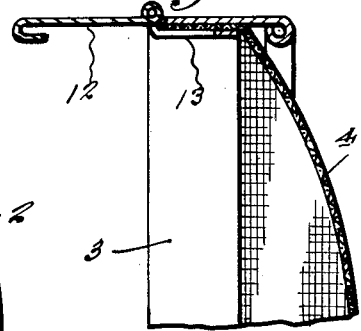
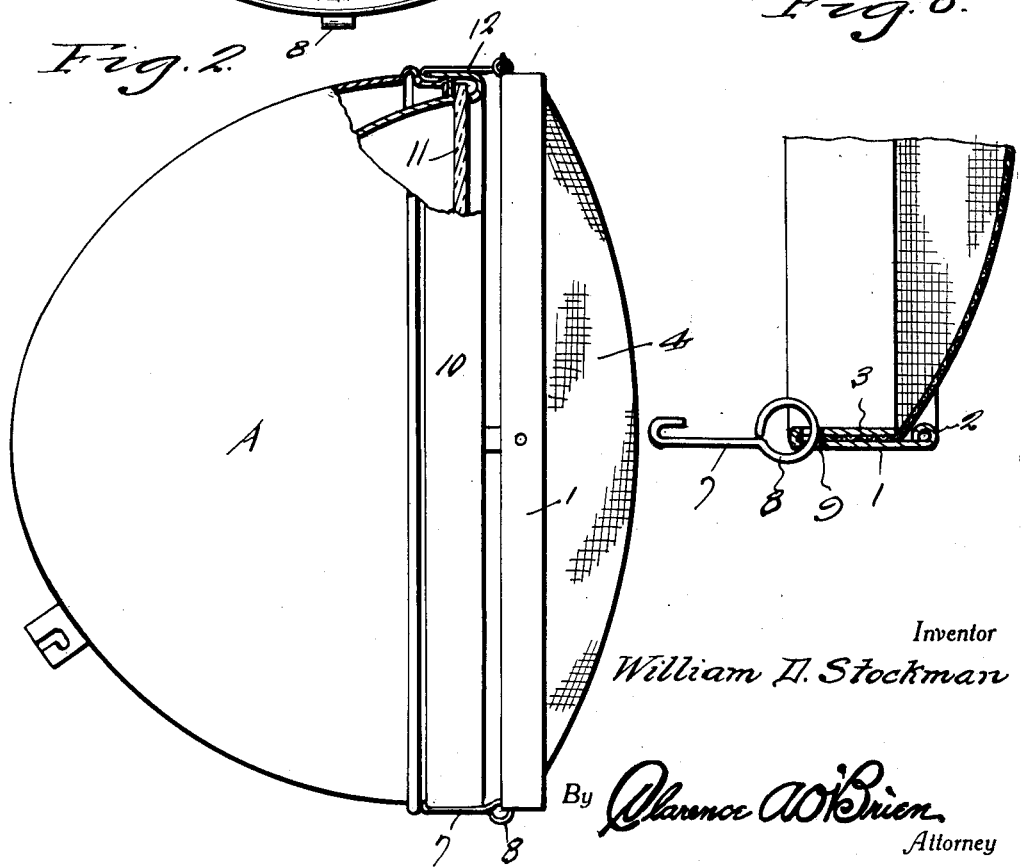
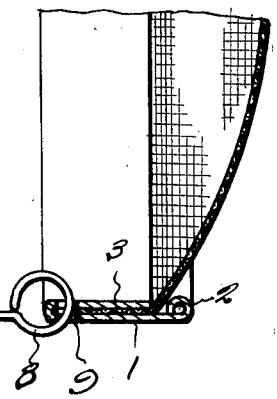
Inventor
William D. Stockman
By Clarence A. O'Brien
Attorney May 23, 1933. W. D. STOCKMAN 1,910,779
LENS PROTECTOR FOR HEAD LAMPS
Filed Jan. 28, 1932 2 Sheets-Sheet 2
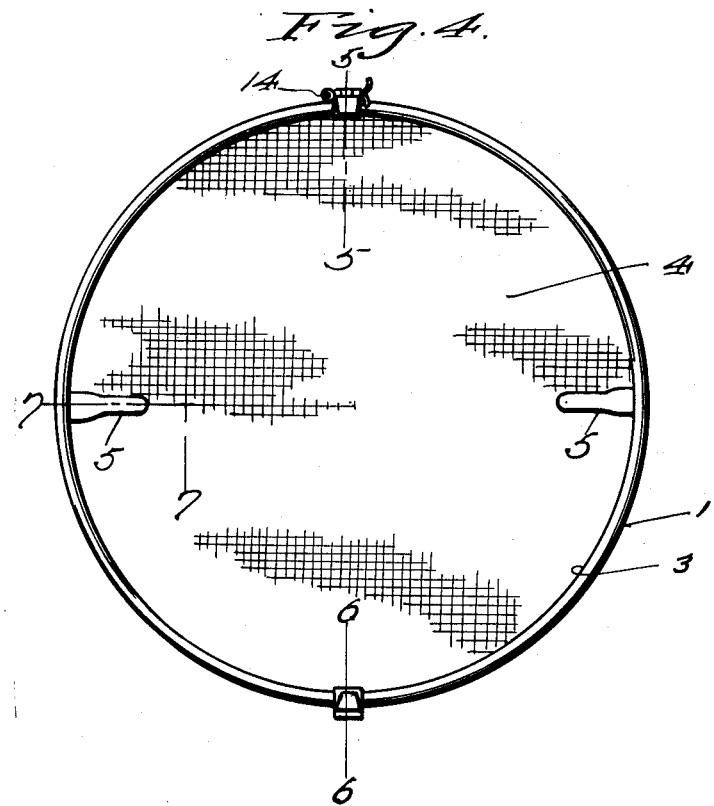
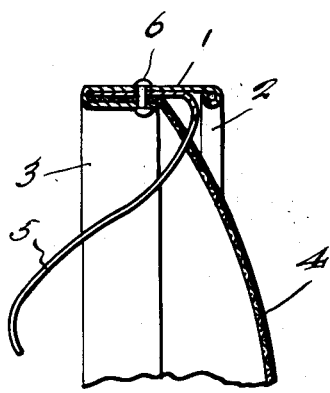
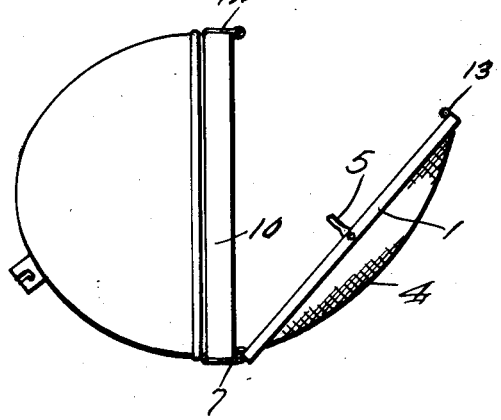
Inventor
William D. Stockman
By Clarence A. O'Brien
Attorney Patented May 23, 1933

1,910,779

UNITED STATES PATENT OFFICE

WILLIAM D. STOCKMAN, OF NEW ORLEANS, LOUISIANA

LENS PROTECTOR FOR HEAD LAMPS

Application filed January 28, 1932. Serial No. 589,497.

This invention relates to a protecting device for the lenses of head lamps of automobiles and the like, the general object of the invention being to provide a frame carrying a screen with means for attaching the frame to a head lamp so that the screen will protect the lens of the lamp from damage when stones or the like are thrown by wheels of passing vehicles.

This invention also consists in certain other features of construction and in the combination and arrangement of the several parts to be hereinafter fully described, illustrated in the accompanying drawings and specifically pointed out in the appended claims.

In describing the invention in detail reference will be had to the accompanying drawings wherein like characters denote like or corresponding parts throughout the several views, and in which:—

Figure 1 is a front view of the device.

Fig. 2 is an elevation, partly in section, showing the invention in use on a head lamp.

Fig. 3 is a similar view but showing the invention swung away from the head lamp to permit the lens to be cleaned.

Fig. 4 is a view looking toward the inner face of the device.

Fig. 5 is a section on line 5—5 of Fig. 4.

Fig. 6 is a section on line 6—6 of Fig. 4.

Fig. 7 is a section on line 7—7 of Fig. 4.

In these drawings, the numeral 1 indicates a ring preferably having its front edge rolled as shown at 2 with its rear part folded as shown at 3 to clamp the edges of a screen 4 between the folded part and the major portion of the ring. A pair of spring fingers 5, arranged at opposite sides of the ring, have their bent outer ends also held between the folded part and the major portion of the ring, and rivets 6 hold the parts in assembled relation as shown in Fig. 7.

The screen is of concavo-convex shape with its convex face extending forwardly and this shape of the screen affords a spring-like resistance to objects thrown against it. The folding of the rear part of the ring not only provides means for holding the screen and the spring fingers in position, but also reinforces the ring.

A hook member 7 has an eye 8 at one end passing through an opening 9 formed in the ring, preferably at the bottom thereof, and the hook of this member is adapted to engage the rim 10 which holds the lens 11 of the head lamp A in position. The eye 8 and the hole 9 act as a hinge for hingedly connecting the device to the head lamp as shown in Fig. 3.

A second-hook-shaped member 12 is adapted to be engaged with the rim 10 at the top of the head lamp and this member is detachably connected to a clip 13 attached to the ring 1, by a cotter pin 14 or the like, so that by removing the pin the device can be swung to the position occupied in Fig. 3, or to a position that will hang from the member 7, so that the lens of the head lamp can be cleaned.

The spring fingers 5 engage portions of the lens and act to hold the device against movement and thus prevent rattling or other noises.

From the foregoing it will be seen that I have provided a simple protecting device for the lens of a head lamp of an automobile or the like, so that the lens is protected from damage by stones or other objects thrown off the road by a passing vehicle.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described my invention, what I claim as new is:—

1. A protective device for a head lamp having a lens rim comprising a ring, a concavo-convex screen having its periphery supported by the ring, a hook member having an eye thereon passing through a hole in the ring, the hook member adapted to engage the rim, and latch means for connecting an opposite part of the ring to the said rim, said latch means including a hook engaging the rim.

2. A protective device for a head lamp having a lens rim comprising a ring, a concavo-convex screen having its periphery supported by the ring, a hook member having an eye thereon passing through a hole in the ring, the hook member adapted to engage the rim, and latch means for connecting an opposite part of the ring to the said rim, said latch means including a hook engaging the rim, and spring fingers carried by the ring for engaging the lens of the head lamp to hold the device against movement.

In testimony whereof I affix my signature.

WILLIAM D. STOCKMAN.